United States Patent Office 3,740,210
Patented June 19, 1973

3,740,210
MECHANICALLY-ALLOYED ALUMINUM-ALUMINUM OXIDE
Michael James Bomford and John Stanwood Benjamin, Suffern, N.Y., assignors to The International Nickel Company, Inc., New York, N.Y.
No Drawing. Filed July 6, 1971, Ser. No. 160,202
Int. Cl. B22f 9/00
U.S. Cl. 75—.5 AC                                    10 Claims

ABSTRACT OF THE DISCLOSURE

A mechanically alloyed composite powder wherein individual particles include an aluminum matrix having equiaxed aluminum oxide dispersoid particles having a size of about 100 A. to 2,000 A. uniformly distributed therethrough at particle spacings of about 500 to 3,000 A. Products made by consolidating the mechanically alloyed powder exhibit improved strength properties at relatively low dispersoid contents.

A process for producing such mechanically alloyed composite powder including milling under dry conditions and in the presence of a surfactive agent, preferably a volatilizable organic material.

---

The present invention relates to dispersion-strengthened materials, and, more particularly, to alumina dispersion-strengthened aluminum powder and consolidated products made therefrom, as well as a method of making such powder and products.

Dispersion-strengthened aluminum, commonly known as sintered aluminum product (S.A.P.) was reported by Irmann. Such sintered aluminum product, produced by hot pressing aluminum powder, shows surprisingly high levels of hardness and tensile strength, these high levels being attributed to the presence of aluminum oxide dispersoid present in the form of thin surface layers on the original powder particles. The basis for the success of S.A.P. material has to do with the fact that the surface of aluminum that is freshly exposed to an oxygen-containing atmosphere (even atmospheres having low oxygen partial pressures) immediately becomes coated with a thin, adherent and chemically stable film of aluminum oxide, which aluminum oxide acts as a dispersoid in S.A.P.

The production of dispersion-strengthened aluminum may conveniently be considered under two aspects: (a) the production of dispersion-strengthened aluminum powder and (b) the processing of such powder into the desired solid form. The object in the production of dispersion-strengthened aluminum powder prior to compaction is to attain eventually a fine homogeneous dispersion of aluminum oxide in the aluminum matrix. Aluminum powder produced by the atomization of aluminum generally has an oxide content of 0.1 to 1.5%, which occurs as a coating about each powder particle. Atomized powder is, in some cases, suitable for direct conversion to solid aluminum products. However, since the oxide films are only at the surfaces of the aluminum powder particles, the spatial separation of the aluminum oxide films in the aluminum powder and the inter-particle spacing of the aluminum oxide-dispersoid particles of the final aluminum product is limited by the size of the starting aluminum powder particles. Consequently, because of its relatively large particle size and relatively low aluminum oxide content, atomized aluminum powder for S.A.P. production is usually subjected to further processing by ball milling.

In a process other than atomization, for producing aluminum powders a foil or cast flakes of aluminum are fed into a trough and exposed to the pounding action of mechanical stamps so that the foil or cast flakes are converted to thin flakes or plates that eventually fracture. Stearic acid is added to the aluminum during the stamping process to act as a lubricant, thereby preventing the welding together of the individual powder particles. The resulting thin flake-like particles are usually processed further by ball milling.

However, prior art attempts to increase the strength of aluminum-aluminum oxide alloys by the ball-milling the aluminum powder to reduce the size of the aluminum particles, and, therefore, the inter-particle spacing of the aluminum oxide dispersoid, have required relatively long ball-milling times; for example, the ball-milling time reported for reducing a 5–6 micron aluminum particle to about 2–3 microns in about 80 hours and about 200 hours is needed to achieve a size of about 1–2 microns. In addition, there is the possibility of pyrophoricity where such small powder particle sizes are achieved, so that it is necessary to employ measures to avoid combustion of the powder.

Ball milling of aluminum powder generally is conducted either in a dry condition in a protective atmosphere of less than 10% oxygen, or in oil. Approximately 3% (by weight of the aluminum powder charge) of stearic acid is added as a surfactant when the ball milling is done dry. However, the powder produced by this process has a bulk density of only about 0.1 to 0.2 gram per cubic centimeter and generally is unsuitable for powder metallurgical work, on a commercial basis at least. Powder having a higher bulk density, e.g., about 1 gram per cubic centimeter, is made by limiting the stearic acid addition so that partial welding of the aluminum to the ball charge occurs, a coarse flowable powder being produced thereby. The final particle sizes of such ball-milled aluminum powders generally are approximately 100 microns, with aluminum oxide contents of between 6 and 15%. The dispersoid distribution in aluminum products made from conventionally ball milled aluminum-aluminum oxide powder is, however, inefficient in the sense that the dispersoid particles, which are formed by surface oxidation of the aluminum powder particles before and possibly during the ball milling operation, are flake-like, so that a high dispersoid content is necessary to achieve sufficiently high levels of strength in the resulting S.A.P. material.

In the conversion of aluminum powders to the desired solid forms it is possible to directly extrude to a solid product those aluminum powders containing about 1.5% by weight or less aluminum oxide. For aluminum powders having higher oxide contents, however, it is necessary to proceed through preliminary processing, namely, either cold compaction (e.g., at 15,000 to 30,000 p.s.i.) and sintering and/or hot compaction, to provide a billet which can then be extruded to give a fully dense product.

Hot-compaction at pressures up to 150,000 p.s.i. may be employed to provide the initial billet. Extrusion temperatures of 850 to 900° F. are usually applied with reduction ratios of 20:1 to 30:1, with higher reductions on extrusion usually being done in two steps.

Thereafter, the semi-finished extruded form is converted into the finished product by normal hot and cold working procedures, such as forging, drawing, swaging, upsetting, rolling, sheet forming and machining. In general, the workability of dispersion strengthend aluminum decreases as the oxide content increases, which points out the desirability of lower aluminum oxide dispersoid contents in S.A.P.-type products.

With respect to the mechanical properties of prior art alumina dispersion-strengthened aluminum products, tensile strength and creep strength generally increase with increasing oxide content. The tensile strength of dispersion strengthened aluminum with a low dispersoid content is no greater at room temperature than that of heavily worked pure aluminum but it is greater at elevated temperatures. With higher aluminum oxide contents, dispersion-strengthened aluminum products exhibit higher room temperature tensile strength. For instance with 3% alumina, the room temperature tensile strength is less than 28,000 p.s.i., and with 6% $Al_2O_3$ the tensile strength is about 35,000 p.s.i. The rate of increase of strength with increasing oxide content becomes lower at higher oxide contents, e.g., alumina contents of 10% and higher.

The creep-rupture strength at elevated temperatures also increases for conventional materials with increasing oxide content. Dispersion-strengthened aluminum materials show greater strength than the strongest age-hardenable aluminum alloys at temperatures greater than about 500° F. The best stress-rupture properties reported for dispersion strengthened aluminum appear to be 100 hour lives at stresses of 23,000 p.s.i., 18,000 p.s.i. and 11,000 p.s.i. at 400° F., 600° F., and 800° F., respectively, all with 12 to 14% $Al_2O_3$. The reported stress-rupture values fall with decreasing aluminum oxide content; for example, with a 6 to 8% aluminum oxide content, the stress-rupture life is 100 hours at 12,000 p.s.i. and 600° F. as well as at 7,000 p.s.i. and 800° F.

The electrical conductivity of available dispersion-strengthened aluminum decreases with increasing oxide content. At 5% $Al_2O_3$ the electrical conductivity is about 55% of the Internatioanl Annealed Copper Standard (I.A.C.S.); at 10% $Al_2O_3$, it is 49.5% I.A.C.S.; and at 13.5% $Al_2O_3$, it is 42.5% I.A.C.S.

The morphology of the $Al_2O_3$ dispersoid of available S.A.P. products, including those made from ball-milled powders, is flaky, the dispersoid generally having a thickness of about 100 A. to 400 A. and a width of about 1,400 A. to 3,000 A. or higher. However, the flake-like alumina dispersoid particles are inhomogeneously distributed throughout the aluminum matrix and the resulting strengthening effect is inefficient. For example, the flake particles become aligned in the direction of extrusion or other working. For these reasons, relatively high dispersoid contents are necessary to achieve desired tensile strength levels, but such strength levels are achieved at the expense of electrical conductivity.

It appeared that improved combinations of strength, stress-rupture life, electrical conductivtiy and thermal conductivity, of aluminum and aluminum alloy products dispersion-strengthened with alumina could be achieved if only the alumina could be more uniformly distributed through the metal matrix in the form of fine particles, preferably having a substantailly equi-axed morphology, rather than in the form of thin, flake-like, non-homogeneously distributed particles.

The mechanical alloying process described in the copending Benjamin U.S. application Ser. No. 709,700, filed Mar. 1, 1968, appeared to provide a solution to the problem. In the process described in the said Benjamin application, a charge of powder particles is subjected to dry milling, usually in the presence of a body of grinding media, e.g., balls, under high energy conditions sufficient to comminute the powder particles of the charge and, through a combination of comminution and welding actions repeatedly conducted by the milling, create new, dense composite particles containing fragments of the initial powder materials intimately associated and interdispersed. Very short distances across the areas corresponding to the fragments of initial materials in the dense composite product particles can be created, e.g., on the order of 3 microns or 1 micron or less, and fine dispersoid particles included in the powder charge can be uniformly distributed throughout the powder product particles at short interparticle spacings, e.g., one micron or less. The Benjamin application discloses the treatment of a. wide variety of powder charges representing a wide variety of metal systems to produce a dense mechanically-alloyed powder of substantially saturation hardness for the system involved.

The mechanical alloying process may be conducted in a variety of equipment, including a stirred ball mill, shaker mill, vibratory ball mill, planetary ball mill, and even certain ball mills provided attention is had to the ball-to-powder ratio of the charge and size of the mill as taught by the above Benjamin application.

One type of stirred ball mill attritor found to be particularly advantageous for carrying out the Benjamin invention comprises an axially vertical stationary cylinder or tank having a rotatable agitator shaft located co-axially of the mill with spaced agitator arms extending substantially horizontally from the shaft, such a mill being described in Szegvari U.S. Pat. No. 2,764,359 and in Perry's Chemical Engineer's Handbook, fourth edition, 1963, at pp. 8 to 26. The mill contains attritive elements, e.g., balls, sufficient to bury at least some of the arms, so that, when the shaft is rotated, the ball charge, by virtue of the agitating arms passing through it, is maintained in a continual state of unrest or relative motion throughout the bulk thereof. The mill can be water cooled by means of a jacket about the tank.

Aluminum has the relatively low melting point of about 660° C., with the result that processing at ambient temperatures or above (as are encountered in dry milling with a charge of metal balls) is necessarily conducted at a high homologous temperature. Consequently, it was found that an attempt to dry process aluminum powder having a naturally-occurring surface film of alumina in a sealed air atmosphere in a stirred ball mill at ambient temperatures and above resulted very quickly in welding of the powder charge to the grinding balls and the mill surfaces. The effect could be compensated for by operating at cryogenic temperatures, e.g., lower than —100° F., but the mechanical difficulties associated with this procedure indicated that prohibitive costs would result.

We have now discovered a procedure whereby aluminum and aluminum alloy products dispersion-strengthened with alumina, can be produced without resorting to cryogenic processing, which products have uniformly distributed therethrough dispersed alumina in the form of small, substantially equi-axed particles, and which are characterized by improved combinations of strength, stress-rupture and electrical conductivity at relatively low dispersoid contents.

Generally speaking, the present invention is directed to dry high energy milling of a powder charge comprising aluminum powder with a thin aluminum oxide surface film, in the presence of a weld-retarding amount of an asymmetric organic compound (i.e., a surfactive agent) which preferably is at least substantially in the vapor state at the milling temperature. The milling conditions are sufficiently energetic and conducted repetitively for sufficient time to comminute the metal and oxide constituents of the powder charge and weld together the comminuted fragments into the form of newly created, dense composite mechanically-alloyed particles wherein the distance across comminuted fragments within the composite particles becomes very short, e.g., less than about 3 microns or even 1 micron, and wherein the comminuted oxide fragments become finer, more equi-axed, more closely spaced, and more homogeneously distributed as milling proceeds. As used herein, the term "aluminum" is defined to include metallic aluminum, as well as aluminum base alloys. Aluminum powder having an average initial particle size of up to about 20 to 1,000 microns, or even higher, e.g., 50 to 200 microns, can be used in practicing the present invention.

The surfactive agent employed in the mechanical alloying process serves to retard but not prohibit, the welding of the aluminum particles to each other, thereby allowing the achievement of a greater degree of comminution thereof, and to minimize excessive welding of the powder particles to the balls and mill surfaces. Such retardation also allows the aluminum oxide particles to be comminuted to a substantially equi-axed morphology, under high energy milling and to a relatively uniform size of comparatively small value and to be distributed throughout the aluminum matrix with a relatively high degree of uniformity, thereby providing the benefits noted below.

The surfactive agent can be added directly into the mill, e.g., attritor mill, with the charge of powder particles and grinding media, before the milling operation is begun or it can be added periodically in the course of the mechanical alloying process, or, alternatively, the surfactive agent can be vaporized at a point outside the mill and continuously or intermittently introduced, in vapor form, to the interior of the mill while the milling operation is being carried out, all of these techniques coming within the definition of "dry milling" as that term is used herein with regard to the present invention.

While the manner in which the surfactive agent retards the welding process is not explainable definitely, it is believed that it does not act as a lubricant in the powder charge but that its action is otherwise. It is believed, however, that a molecule of the surfactive agent ought to have a relatively metallophilic component and a relatively metallophobic component, i.e., that the molecule be asymmetric, the relatively metallophilic component (e.g., the OH group of methanol) being adsorbed at or otherwise associated with the surface of a powder particle and the relatively metallophobic component (e.g., the $CH_3$ group of methanol) acting as a barrier to either the surface of another powder particle or another such metallophobic component associated with the surface of another powder particle. Carbon dioxide and water, which have molecules of symmetric structure, have been found to be ineffective as surfactive agents for mechanically alloying aluminum powders.

It is preferred that the surfactive agent be a material that is readily volatilized, and more preferably, an organic material that can be volatilized (including sublimed) with relative ease under the temperature conditions existing during milling.

The utilization of the surfactive agent in a vapor state appears to allow a greater efficiency of distribution of the surfactive agent throughout the powder charge within the attritor mill than does a non-vaporous material since substantially all of the surfaces of the powder charge are exposed to the surfactive agent vapor, leading to improved results.

It is most preferred that the surfactive agent be an organic material that exhibits a vapor pressure of about 1 or more, and preferably at least about 40 mm. of mercury at the temperature levels (e.g., about 160° F.) present during milling, i.e., the overall, or gross, temperature of the powder, grinding balls, etc., contained in the mill, but it is sufficient that the surfactive agent be liquid at these temperatures. Generally, asymmetric organic materials having boiling points up to about 700° F. can be used as surfactive agents. Satisfactory organic surfactive agents include alcohols, ketones, aldehydes, ethers, and organic acids, preferably those having boiling points not exceeding about 200° F. to 400° F., e.g., about 300° F., and having 1 to about 15 carbon atoms per molecule. Satisfactory surfactive agents include formic acid, acetic acid, methanol, ethanol, butanol, propanol, acetone, diethyl ether, trioxane and formaldehyde.

Where electrical conductivity or drawability of consolidated products made from the composite powder are important, a surfactive agent that contains a relatively low number of carbon atoms per molecule (e.g., 1 to 6) is preferred, so as to minimize residual carbon therein, since the surfactive agent becomes incorporated within the product powder during the mechanical alloying process and excessive carbon in an amount greater than, e.g., about 0.5 weight percent resulting from decomposition of the surfactive agent, impairs those properties of such products. Therefore, while fatty acids, e.g., stearic acid, may be employed in the milling operation to produce mechanically alloyed aluminum powder having well-distributed oxide particles, the accompanying carbon in the product produced from the mechanically alloyed powder is found to reduce desired properties, such as drawability and conductivity.

The amount of surfactive agent that is needed to mechanically alloy aluminum powder generally increases with increased milling time and/or with excessively high milling temperatures (e.g., higher than about 300 to 350° F.), but this amount generally is quite small; for example, with most satisfactory surfactive agents, an amount that is about 0.3 weight percent to about 4 weight percent, and preferably to about 2 weight percent, e.g., about 0.5 weight percent to about 1 weight percent of the powder charge.

The minimum amount of methanol that is required to mechanically alloy −100 mesh aluminum powder appears to be about 0.65 weight percent where the milling time is 17 hours.

That residual impurities, e.g., carbon, trapped within the mechanically alloyed powder composites cannot be removed with ease is pointed out by the fact that, in the case of an aluminum powder-alumina charge mechanically alloyed with only about 0.7 percent by weight (all percentages of surfactive agent recited herein are on the basis of the weight of the aluminum powder-alumina charge provided in the attritor mill) of methanol surfactive agent, the carbon levels were the same both before and after the mechanically alloyed powder was vacuum annealed at 950° F. for one hour. Similarly, the surfactive agent cannot be leached out with a solvent, such as carbon tetrachloride. In contradistinction, such lubricants are generally considered to be more readily removable from conventionally ball-milled powders.

In the mechanical alloying operation the comminuted particles, or fragments, of aluminum and aluminum oxide are mutually interdispersed in the product composite powder, the comminuted particles of aluminum oxide being surrounded by the aluminum particles that are bonded, or welded, together and the aluminum oxide particles being dispersed throughout the resulting aluminum matrix. As the mechanical alloying operation continues, the aluminum oxide particles are fragmented to smaller and more uniform sizes and assume, to a greater degree, a substantially equi-axed morphology, and the welded and unwelded aluminum particles are continuously fragmented, or comminuted, thereby creating new surfaces, and welded together to form the composite particles including alumina dispersoid. Also, with increased milling, the homogeneity of the dispersion of comminuted aluminum oxide particles in the aluminum matrix is increased, the milling preferably being conducted to achieve a volumetric density distribution of the aluminum oxide comminuted particles of at least about 100 particles/cubic micron, e.g., about 500 to 4,000 particles per cubic micron. Where the average particle size of the initial powder is about 20 microns to 200 microns, it is preferred that the milling operation be conducted at least until the composite particle average size exceeds the average particle size of the initial powder, so as to achieve a satisfactory degree of comminution and a substantially equi-axed structure for at least a substantial portion (e.g., at least 80%, preferably, 90% or higher) of the aluminum oxide particles, and further, to achieve substantially complete mutual interdispersion of the comminuted aluminum and alumina. For example, the average particle size for the composite powder is about 200 microns or greater.

Mechanical alloying can be achieved by, for example, "agitation milling," or "high energy milling," which is that condition that is developed in the mill when sufficient mechanical energy is applied to the total powder charge such that a substantial portion of the attritive elements, e.g., ball elements, are continuously and kinetically maintained in a state of relative motion. For optimum results, it has been found advantageous to maintain at least a major portion of the attritive elements, e.g., balls, out of static contact with each other; that is to say, mainained kinetically activated in random motion so that a substantial number of the elements repeatedly collide with one another. It has been found advantageous that at least about 40%, e.g., 50% or 70% or even 90% or more, of the attritive elements should be maintained in a highly activated state. Also, a ball-to-powder volume ratio of about 4:1 to 50:1 is preferred, a more preferred volume ratio being about 15:1 to 30:1.

The mechanical alloying of aluminum powders may be conducted in a wide variety of equipment, including a stirred ball mill, a shaker mill, a vibratory ball mill, a planetary ball mill, and even certain ball mills.

While the foregoing preferred high energy condition usually does not prevail in the conventional ball mill, in which a substantial portion of the ball elements is maintained in static bulk contact with each other, it is possible to employ such mills in carrying out the present invention, provided there is sufficient activation of the attritive elements in the cascading zone of the mill and, also, provided the mill chamber is of relatively large diameter and the volume ratio of attritive elements to the powder charge is high, for example, above 10 to 1; e.g., 18 to 1 and higher. Even so, longer milling times would be encountered.

For mechanically alloying aluminum powder (i.e., aluminum particles having an aluminum oxide surface skin) having an average initial particle size of about 1,000 microns or smaller, in a stirred ball mill, e.g., a 1 gallon Szegvari mill which has a chamber diameter of about 9 inches, there can be employed an impeller speed of about 165 to 175 r.p.m., the preferred volume ratio of balls-to-powder being about 20 to 1, and the preferred milling times ranging from about 12 to 25 hours. The required processing time generally decreases, however, with increasing impeller speed and/or mill diameter.

The mechanically alloyed composite powder particles contain preferably, from 2.5 to 10 weight percent aluminum oxide dispersoid particles that are substantially equi-axed and are substantially uniform in size, these dispersoid particles being substantially uniformly distributed throughout the aluminum matrices of the various composite particles. The comminuted particles, or fragments, derived from the starting powder constituents are intimately related and bonded, or welded, together, providing composite powder particles, which are not readily frangible or friable. The composite powder particles exhibit hardness which increases with increasing processing time; for example, an average hardness of 60, or even 100, kg. per square mm. Vickers Hardness Number for aluminum metal-aluminum oxide.

Also, the estimated average volumetric distribution density of the alumina dispersoid particles in these mechanically alloyed powders is about 500 to 4,000 particles per cubic micron, e.g., about 2,000 particles/cubic micron. Because the individual composite powder particles are relatively coarse, they exhibit a relatively high bulk density e.g., about 1 gm./cm.$^3$ or more.

Preferably, more than 80% of the substantially equi-axed aluminum oxide particles are generally smaller in size than about 1,000 A. and substantially all of these particles are smaller than about 2,000 A. in diameter, and more preferably, smaller than about 600 A., the particles having a preferred average interparticle spacing between centers of about 1,500 A. to 3,000 A.

The mechanically alloyed composite powders can be consolidated into powder metallurgy products by, for example, mechanically or hydrostatically compacting the composite powders and then sintering the aluminum compacts and hot extruding the sintered compacts to achieve substantially complete densification. "Alternatively, the mechanically alloyed powders can be hot pressed and then hot extruded, or the powders can be hot extruded or hot rolled to a consolidated form without prior compaction or sintering. Extrusion ratios of 5:1 to 10:1 or higher are preferred; however, especially where the mechanically alloyed powders are hot extruded without prior compaction or sintering, an extrusion ratio of 20:1 to 30:1 or higher is more preferred.

Powder metallurgy products made from mechanically alloyed composite powder particles differ significantly in form and properties, at least, from the S.A.P., type products made from aluminum powders having aluminum oxide concentrated at the outer surfaces of the particles.

The consolidated products of the present invention generally exhibit the same structural attributes as the powder particles from which they are produced; viz, each includes substantially equi-axed aluminum oxide dispersoid particles that are homogeneously distributed in the aluminum matrix, that have an average diameter of about 100 A. to 600 A. with an average center-to-center interparticle spacing of about 500 A. to 3,000 A. Since not all of the substantially equi-axed dispersoid particles are perfect spheres, the term "diameter" as used herein with respect to these non-spherical particles is defined to be the average dimension thereof. It is noted that the desirable dispersoid size, shape, and distribution are already attained before working the mechanically alloyed composite powder.

The consolidated powder metallurgy products exhibit very desirable mechanical properties, such as room temperature, ultimate tensile strengths (U.T.S.) exceeding about 45,000 p.s.i. and 100 hours stress-to-rupture lives at at least about 12,000 p.s.i. at 600° F. and at least about 8,000 p.s.i. at 800° F., these strengths being for such a product in the as-extruded condition. These superior mechanical properties are achievable with low aluminum oxide contents, e.g., only about 3 to 5 weight percent, and with no sacrifice in electrical conductivity of the products of the present invention in the drawn or drawn-and-annealed condition.

In powder metallurgy products made from the mechanically alloyed composite powder particles, such as extrusions and drawn wire, for example, individual oxide particles were not visible in the product, with an optical microscope at magnifications of up to 1,000 diameters.

The aluminum oxide of the mechanically alloyed composite powder, and therefore, products made therefrom, can be provided by the naturally-occurring oxide films on the aluminum particles of the initial powder charge and that formed by the reaction between oxygen in the milling chamber and metal surfaces that are freshly generated in the mechanical alloying process; for example, up to about 6% by weight, e.g., from about 3% up to 6% aluminum oxide can be produced thereby. The aluminum oxide content of the composite powder and of consolidated products made therefrom can be controlled by adding fine alumina to the charge, by adding oxygen to the mill chamber during processing or by a combination of such steps. Also, the surfactive agent can be selected so that it contains a relatively large amount of oxygen and can, therefore, serve as a source of oxygen for increasing the oxide content of the mechanically alloyed powder and, therefore, of the consolidated product.

Where the aluminum products of the present invention are to be used as electrical conductors, the aluminum oxide content thereof is maintained in the range of about 3 weight percent to about 5 weight percent to achieve room temperature ultimate tensile strengths of about 45 k.s.i. to about 54 k.s.i., together with an electrical conductivity of about 57% to about 61% I.A.C.S.

In addition, relatively high thermal conductivities would be expected by the parallel trends of electrical and thermal conductivities experienced for conventional S.A.P. and also predicted theoretically for pure metal matrices by the Wiedemann-Franz Law.

It is desirable to maintain the carbon level below about 0.5 weight percent and the aluminum oxide content below about 5 weight percent so as to allow the consolidated products to be cold worked (e.g., drawn to wire or rolled to sheet) with relative ease. However, somewhat higher levels of carbon and/or aluminum oxide are acceptable where the consolidated products are to be hot worked.

While the present invention does not require the provision of any materials to the powder charge of aluminum and aluminum oxide other than the relatively small amounts of surfactive agent material mentioned above, there can be added to the powder charge refractory oxides of metals other than aluminum (e.g., yttria, thoria, magnesia, etc.), the particles of which refractory oxides are suitable for dispersion strengthening. These other oxides can also be comminuted and homogeneously distributed throughout the aluminum matrices by mechanical alloying, as described above.

The initial powder charge can be in the form of prealloyed particles of the particular desired aluminum alloy (e.g., a master alloy containing some or all of the individual alloy constituents) or in the form of different powders of the respective alloy constituents. Where the alloy constituents are added as separate powers, the mechanical alloying process comminutes, interdisperses, and welds together the various powder particles and fragments so that the matrix of each resulting dispersoid-containing composite powder particle contains the alloy composition substantially homogeneously distributed therethrough. The aluminum alloys can contain, for example, up to, by weight, about 2% nickel; up to 0.5% chromium; up to 10% copper; up to 21% silicon; and/or up to 1.5% manganese; 10% magnesium; 10% zinc; 20% tin; 2% iron; 1% lead; 1% bismuth; 0.2% zirconium; 0.2% titanium; 1.5% lithium; 0.1% vanadium; 0.8% cadmium; 0.02% boron; and 0.05% beryllium.

EXAMPLE I

Each one of five 350 gram lots (Lots 1 through 5) of −100 mesh commercially produced aluminum powder containing, by weight, about 0.1% oxygen, about 0.05% each of iron, silicon, manganese, carbon and magnesium, less than 0.1% zinc, balance essentially aluminum, was separately introduced into the chamber of a one gallon capacity Szegvari attritor which contained about 50 pounds of 5/16-inch diameter steel balls to provide a ball-to-powder volume ratio of 20 to 1. About 0.85% by weight of methanol for Lots 1 and 2 and about 0.65% of methanol for Lot 3 were employed as a surfactive agent. The chamber was sealed to air and each lot was milled for about 17 hours at an attritor impeller speed of 170 r.p.m., the mechanical alloying operation generating sufficient heat so that the water-cooled attritor reached a steady state temperature of about 160° F. The powder of each one of Lots 4 and 5 was milled in the same way, the surfactive agents for these lots being about 1.85% and 1.0%, respectively, of stearic acid. The milled powders were respectively removed from the mill and packed and sealed into aluminum cans.

The canned Lot 1 powder was heated to 950° F. and compacted by upset extrusion using a dummy block to close the die opening of the extrusion press. The powder compact of Lot 1 was subsequently heated to 900° F. and extruded at a 45:1 reduction ratio. Lot 2 was compacted in the same way as Lot 1 but at a temperature of about 1,000° F. and the compact thereof was extruded in the same manner as that for Lot 1. Lot 3 was compacted and extruded in the same manner as Lots 1 and 2, except for a compaction temperature of 975° F. and an extrusion temperature of 850° F. It is preferred that the compaction of mechanically alloyed composite aluminum powders be carried out at temperatures of at least about 900° F. to minimize the possibility of cracking in the subsequent extrusion process.

The canned powder of Lot 4 was extruded at 900° F. without any previous compaction, the extrusion ratio being about 28 to 1. The canned powder of Lot 5 (1.0% stearic acid) was extruded without previous compaction in the same way as Lot 4.

The extrusions (numbered 1 through 5 to correspond to the powder lots) produced from the various powder lots were tested and chemical analyses were conducted thereon, the average values of the results of the analyses and tests being given in Tables I and II respectively:

TABLE I
[Chemical analyses]

| Lot | Surfactive agent [1] | C | O | Equiv. Al$_2$O$_3$ |
|---|---|---|---|---|
| 1 | 0.85% methanol | 0.28 | 1.92 | 4.15 |
| 2 | do | 0.28 | 1.36 | 2.95 |
| 3 | 0.650% methanol | 0.29 | 1.44 | 3.11 |
| 4 | 1.85% stearic acid | 1.53 | 1.85 | 4.05 |
| 5 | 1.0% stearic acid | 0.79 | 2.40 | 5.20 |

[1] Weight percent on the basis of powder charge weight.

TABLE II
[As extruded]

| Lot | Room temp. U.T.S. (p.s.i.) | Stress-rupture (100 hrs./600° F.) (p.s.i.) | Stress-rupture (100 hrs./800° F.) (p.s.i.) |
|---|---|---|---|
| 1 | 53,600 | 18,000 | 8,000 |
| 2 | 46,900 | 12,000 | 11,000 |
| 3 | 45,300 | 15,000 | 12,000 |
| 4 | 65,800 | 25,000 | 15,000 |
| 5 | 59,500 | 24,000 | 15,000 |

The amount of aluminum oxide in the various composite powders, expressed as "equivalent oxide" in Table I was calculated from the analyzed oxygen content, assuming all of the oxygen to be stoichiometrically combined with the aluminum as Al$_2$O$_3$. The higher carbon contents of Lots 4 and 5 are attributable to the stearic acid surfactive agent, which contains more carbon atoms per molecule than methanol.

From Table II, it can be seen that the room temperature ultimate tensile strengths (U.T.S.) of the various extrusions are high, especially in view of their low dispersoid contents. It is also seen from Table II that the stress-rupture values of the extrusions made according to the invention are very high, particularly in light of the relatively low dispersoid contents employed. The higher strengths achieved with extrusions made from Lots 4 and 5 are attributed to the strengthening effects of the higher carbon contents thereof.

Extrusions produced from powder Lots 1, 2 and 3 were drawn with ease to wire of various cross-sectional areas, drawing reductions of at least 5.44 true strain, $e$ (Table III) being achievable without intermediate annealing. $e$ is defined as the natural logarithm of $A_o/A_F$, $A_o$ and $A_F$ being, respectively, the original (before drawing) and final cross-sectional areas of the drawn piece. Products made with the powders mechanically alloyed with stearic acid (viz, Lots 4 and 5) in the as-extruded conditions, could not be drawn to wire, the material fracturing in drawing, apparently due to the higher carbon levels.

TABLE III
[As drawn wire properties]

| Lot | $e$ | U.T.S. (p.s.i.) | Electrical conductivity (percent I.A.C.S.) |
|---|---|---|---|
| 1 | 2.23 | 52,500 | 57.1 |
|   | 3.67 | 50,000 | 57.2 |
| 2 | 2.22 | 50,800 | 57.4 |
|   | 3.60 | 50,900 | 57.2 |
|   | 5.44 | 50,800 | 59.3 |
| 3 | 2.22 | 48,200 | 61.3 |

The respective values of electrical conductivity (viz, greater than about 57%) of the drawn products of the present invention (Table III) compared very favorably with prior art values for dispersion-strengthened aluminum, the highest such values of the aluminum products in the as-drawn condition being obtained in the wires indicated as Lot 3, which were produced from powders mechanically alloyed with the smallest amount of methanol surface agent, viz, about 0.65%.

TABLE IV

[Drawn and annealed]

| Lot | e | Anneal. cond. (° F./hrs.) | U.T.S. (p.s.i.) | Electrical conductivity (percent I.A.C.S.) |
|---|---|---|---|---|
| 1 | 2.23 | 900/6 | 48,400 | 58.6 |
|   | 2.23 | 1,050/6 | 29,700 | 58.5 |
|   | 3.67 | 900/6 | 49,200 | 59.7 |
|   | 3.67 | 1,050/6 | 30,800 | 60.0 |
| 2 | 2.22 | 900/6 | 47,900 | 57.9 |
|   | 2.22 | 1,050/6 | 33,200 | 59.3 |
|   | 3.60 | 900/6 | 50,600 | 58.6 |
|   | 3.60 | 1,050/6 | 32,800 | 60.0 |

Drawn wires made from the composite powders indicated as Lots 1 and 2 were annealed for 6 hours at various temperatures from 900 to 1050° F. and tested for ultimate tensile strength and electrical conductivity, the results thereof appearing in Table IV. Generally, for a given amount of true strain, e, the U.T.S. values of the drawn products annealed at 1050° F. were considerably below the levels for those annealed at 900° F., the latter being only slightly lower in U.T.S. than the as-drawn products. Also, annealing at about 900 to 1050° F. increased the electrical conductivity, whereas annealing at temperatures above 1,100° F. led to a reduction therein.

In general, the above data show that products made from the mechanically alloyed composite products provide advantages not available heretofore in aluminum products made with comparable amounts of aluminum oxide dispersoid (e.g., about 3 to 6 weight percent). Also, it can be seen that the preferred annealing temperatures are those not exceeding about 950° F. Further, the products made with composite powders mechanically alloyed with methanol surfactive agent, exhibited very good drawability without the need for intermediate annealing treatments, up to a true drawing strain of at least about 5.4.

Metallographic examination of specimens from the extrusions prepared from Lots 1 through 5 indicated that no individual oxide particles were viewable at an optical microscope magnification of 1,000 diameters. The transverse grain size in the extruded alumina dispersion-strengthened aluminum is about 0.5 micron to 1 micron, on the average. Transmission electron microscopic examination of the Lot 1 extrusion revealed equi-axed aluminum oxide particles having an average diameter of about 300 A. substantially uniformly distributed throughout the aluminum matrix and some flaky aluminum oxide particles about 100 A. thick and about 1,000 A. wide that were aligned parallel to the extrusion direction, as well as small areas of the aluminum matrix that where virtually dispersoid free and very fed in number, the dispersoid-free areas indicating underprocessing (i.e., insufficient mechanical alloying) of the powder under the conditions existing for this example. The flaky particles were estimated to comprise about 2% of the total number of oxide particles.

EXAMPLE II

Further work was done using a variety of materials as surfactive agents in a Spex mill which is a high-speed laboratory grinding device (shaker mill). The Spex mill chamber was 1½ inches in diameter and 2 inches long. Specifically, a number of charges of the same type of aluminum powder as that used for Example I above, weighing 2.7 grams each, were processed for thirty minutes in the Spex mill under a sealed air atmosphere with 50 grams of steel balls having an average diameter of ⅜″ (i.e., a ball-powder volume ratio of about 6.3 to 1,) the various surfactive agents employed therein being set out in Table V. In the operation of the Spex mill, a steady state temperature condition of about 160° F. was arrived at, each one of the surfactive agents of Table V, exhibiting a significant partial pressure at this mill operating temperature (i.e., 160° F.)

TABLE V

| Surface active agent | Percent surfactive agent [1] | Theoretical percent C added | Percent C analyzed | Percent O |
|---|---|---|---|---|
| Methanol | 0.85 | 0.38 | 0.28 | 1.92 |
| Ethanol | 1.70 | 0.90 | 0.82 | 1.42 |
| Propanol | 1.60 | 1.00 | 0.82 | 1.29 |
| Butanol | 1.90 | 1.20 | 0.77 | 1.41 |
| Acetone | 1.40 | 0.88 | 0.50 | 1.12 |
| Do | 1.41 | 0.88 | 0.53 | 1.85 |
| Do | 0.88 | 0.55 | 0.21 | 1.62 |
| Do | 0.58 | 0.36 | 0.21 | 2.32 |
| Trioxane [2] | 3.04 | 1.22 | 0.62 | 2.32 |
| Do.[2] | 1.96 | 0.78 | 0.44 | 1.00 |
| Do.[2] | 1.01 | 0.40 | 0.33 | 1.60 |
| Do.[2] | 0.53 | 0.21 | 0.21 | 1.29 |
| Do.[2] | 0.27 | 0.11 | 0.11 | 1.07 |
| Diethyl ether | 0.95 | 0.50 | 0.45 | |
| Acetic acid | 3.87 | 1.55 | 1.24 | 3.76 |
| Do | 1.93 | 0.77 | 0.58 | 1.77 |
| Do | ca. 0.97 | ca. 0.38 | 0.53 | 1.61 |
| Formic acid | 3.61 | 0.94 | 0.63 | 2.90 |
| Do | 1.80 | 0.47 | 0.42 | 2.61 |
| Do | ca. 0.90 | ca. 0.24 | 0.37 | 1.85 |

[1] On the basis of aluminum powder charge weight.
[2] Spex mill heated before processing began.

Each one of these surfactive agents (Table V), added in various amounts, allowed the Spex milling operation to be carried out substantially free of excessive welding of the aluminum powder to the balls, etc., except for the 0.27% trioxane. In the cases where milling was done with trioxane, which is a polymer of formaldehyde, the Spex mill was heated before mechanical alloying was begun, to about 160° F., at which temperature trioxane is primarily in the vapor state. Attempts to mill the powder with trioxane, where the powder charge and Spex mill were at room temperature, at which trioxane is substantially in the solid state, at the beginning of the milling process, had resulted in excessive premature welding of the powders. The surfactive agent can also be gaseous organic material, for example, such as formaldehyde, which can be introduced into the mill chamber as a gas or dissolved in a suitable solvent.

Analyzed carbon contents of the processed composite powders correspond fairly well, generally, with the carbon added in the surfactive agent, the later being indicated by the percent theoretical carbon added (Table V).

Methanol, ethanol, propanol, and butanol are all effective surfactive agents in the range investigated. However, ethanol, propanol, and butanol gave a relatively coarse processed powder that partially welded to the ball charge, this welding indicating that the levels of these surfactive agents could not be reduced appreciably below those investigated (Table V). Low carbon contents were obtained with methanol, which appears to be the most efficient surfactive agent of those in Table V.

EXAMPLE III

A further series of powders (Lots 6 through 10 in Table VI) utilizing the same aluminum powder described in Example I was milled under the conditions described in Example I using methanol as the surfactive agent.

TABLE VI

| Powder | Air flow rates, cc./min. | Analyzed percent C | Analyzed percent O | Equivalent $Al_2O_3$ |
|---|---|---|---|---|
| 6 | 50 | 0.69 | 5.90 | 12.5 |
| 7 | 40 | 0.73 | 7.05 | 15.0 |
| 8 | 35 | 0.76 | 5.40 | 11.5 |
| 9 | 30 | 0.29 | 2.08 | 4.44 |
| 10 | 20 | 0.25 | 2.70 | 5.72 |

The methanol was introduced into the mill in vapor form by bubbling an air stream, at various flow rates (Table VI), through room temperature methanol and then directing the air stream into the mill. Each powder lot was processed in the attritor mill for 17 hours at an impeller speed of 170 r.p.m. The methanol vapor carried by the various air streams acted sufficiently as a surfactive agent to prevent excessive welding of the aluminum powder charge to the balls, etc., except at the lowest flow rate, i.e., 20 cm.³/min. for the Lot 10 powder. As shown in Table VI, the carbon and oxygen levels decrease sharply when the air flow rate is reduced from 35 cm.³/min. to 30 cm.³/min. Those powders, indicated as Lots 6, 7, and 8, that were milled using the higher air flow rates, appear to be less satisfactory for electrical conductor applications because of their higher carbon contents. Where lower oxygen levels are sought, a non-oxidizing carrier gas (e.g., nitrogen) can be substituted either totally or partially, for air so as to minimize oxidation of the aluminum powder charge. The carbon and oxygen contents of the mechanically alloyed composite powder, indicated as 9, milled with a 30 cm.³/min. air flow rate, are felt to allow facile processing of that powder into dispersion-strengthened aluminum electrical conductors.

The above-specified amounts of surfactive agent (i.e., about 0.3 to about 4 weight percent) are sufficient to provide on the new surface areas of the powder created during the course of processing, a layer of surfactive agent having an approximate thickness of from 1 to 5 or 10 molecules of the surfactive agent; e.g., where about 0.65 weight percent methanol is used, the methanol layer is about 2 molecules thick on the basis of new powder surface areas created during the course of processing. The area of new powder surface created during milling can be calculated by known means and such area is orders of magnitude greater than the original powder surface area.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. A method of producing a composite aluminum powder comprising:
   (a) providing a powder charge consisting essentially of aluminum and aluminum oxide; and
   (b) dry milling to mechanically alloy said powder charge in the presence of a surfactive agent comprising an organic material having an asymmetric molecule and comprising less than 4 weight percent of the total weight of said powder charge, said mechanical alloying being conducted so as to comminute said aluminum oxide to fragments comprising substantially equi-axed particles about 100 A. to 2,000 A. in diameter.
2. The method defined in claim 1, wherein said surfactive agent comprises a metallophilic component and a metallophobic component.
3. The method defined in claim 1, wherein said surfactive agent is characterized by being at least partially in the vapor state at the milling temperature.
4. The method defined in claim 1, wherein said organic material is characterized by a boiling point in the range up to about 400° F., and contains 1 to about 15 carbon atoms per molecule thereof.
5. The method defined in claim 1, wherein said organic material is characterized by a vapor pressure of about 1 mm. of mercury or higher at a temperature of at least about 160° F.
6. The method defined in claim 1, wherein said organic material consists essentially of trioxane and said powder charge is heated to about 140° F. or higher before and during the milling operation.
7. The method defined in claim 1, wherein said surfactive agent comprises a material selected from the group consisting of organic acids, alcohols, ketones, aldehydes, and ethers, said material containing not more than 15 carbon atoms per molecule.
8. The method defined in claim 1, wherein said surfactive agent comprises methanol in an amount at least about 0.65 weight percent of the total powder charge.
9. The method defined in claim 1, wherein said dry milling is conducted with attritive elements present in at least a 4-to-1 volume ratio with respect to said powder charge.
10. The method defined in claim 1, wherein said volume ratio is at least about 15 to 1.

References Cited

UNITED STATES PATENTS

| | | | |
|---|---|---|---|
| 2,930,686 | 3/1960 | Wolf | 75—0.5 A |
| 3,268,304 | 8/1966 | Vaught et al. | 75—0.5 B |
| 3,297,415 | 1/1967 | Allen | 75—138 |
| 3,322,529 | 5/1967 | Pollock | 75—0.5 B |
| 3,591,362 | 7/1971 | Benjamin | 75—0.5 BA |

WAYLAND W. STALLARD, Primary Examiner

U.S. Cl. X.R.

75—0.5 BC

UNITED STATES PATENT OFFICE
CERTIFICATE OF CORRECTION

Patent No. 3,740,210    Dated June 19, 1973

Inventor(s) MICHAEL JAMES BOMFORD & JOHN STANWOOD BENJAMIN

It is certified that error appears in the above-identified patent and that said Letters Patent are hereby corrected as shown below:

Col. 2 line 9, for "by the ball-milling" read --by ball-milling-- line 15, for "in about 80 hours" read --is about 80 hours--

Col. 8 line 31, for "lives at at least about" read --lives at least about--

Col. 9 line 24, for "are added as separate powers" read --are added as separate powders--

Col. 10 line 18, for "0.650% methanol" read --0.65% methanol--

Under TABLE III, insert --(b) Electrical conductivity--

Col. 11 line 57, for "dispersoid free and very fed in number" read --dispersoid free and very few in number--

Signed and sealed this 29th day of October 1974.

(SEAL)
Attest:

McCOY M. GIBSON JR.
Attesting Officer

C. MARSHALL DANN
Commissioner of Patents